United States Patent
Mirkin et al.

(10) Patent No.: US 7,611,562 B2
(45) Date of Patent: Nov. 3, 2009

(54) TRIANGULAR NANOFRAMES AND METHOD OF MAKING SAME

(75) Inventors: Chad A. Mirkin, Wilmette, IL (US); Gabriella Metraux, Evanston, IL (US); Yunwei Cao, Gainesville, FL (US); Rongchao Jin, Evanston, IL (US)

(73) Assignee: Northwestern University, Chicago, IL (US)

( * ) Notice: Subject to any disclaimer, the term of this patent is extended or adjusted under 35 U.S.C. 154(b) by 386 days.

(21) Appl. No.: 11/786,172

(22) Filed: Apr. 11, 2007

(65) Prior Publication Data

US 2008/0164239 A1 Jul. 10, 2008

Related U.S. Application Data

(62) Division of application No. 10/801,976, filed on Mar. 15, 2004, now Pat. No. 7,252,698.

(60) Provisional application No. 60/454,552, filed on Mar. 14, 2003.

(51) Int. Cl.
B22F 9/16 (2006.01)
(52) U.S. Cl. .................... 75/342; 75/370; 977/773; 977/888
(58) Field of Classification Search ............... None
See application file for complete search history.

(56) References Cited

U.S. PATENT DOCUMENTS

| | | | |
|---|---|---|---|
| 4,992,179 A | 2/1991 | Brierley et al. | |
| 6,130,142 A | 10/2000 | Westwater et al. | |
| 6,214,088 B1 | 4/2001 | Karamanev et al. | |
| 6,417,340 B1 | 7/2002 | Mirkin et al. | |
| 6,476,409 B2 | 11/2002 | Iwasaki et al. | |
| 6,960,334 B1 | 11/2005 | Matsui et al. | |
| 2002/0063212 A1 | 5/2002 | Mirkin et al. | |
| 2003/0136223 A1 | 7/2003 | Jin et al. | |
| 2004/0180379 A1 | 9/2004 | Van Duyne et al. | |
| 2005/0056118 A1 | 3/2005 | Xia et al. | |
| 2007/0056659 A1 | 3/2007 | Mirkin et al. | |
| 2008/0081016 A1* | 4/2008 | Peng et al. .................. 423/509 |

OTHER PUBLICATIONS

Haes et al., "A nanoscale optical biosensor: sensitivity and selectivity of an approach based on the localized surface plasmaon resonance spectroscopy of triangular silver nanoparticles," *JACS Articles*, 124:10596-10604 (2002).

(Continued)

*Primary Examiner*—George Wyszomierski
(74) *Attorney, Agent, or Firm*—Marshall, Gerstein & Borun LLP

(57) ABSTRACT

The present invention provides nanoprisms etched to generate triangular framework structures. These triangular nanoframes possess no strong surface plasmon bands in the ultraviolet or visible regions of the optical spectrum. By adding a mild reducing agent, metal ions remaining in solution can be reduced, resulting in metal plating and reformation of nanoprisms. The extent of the backfilling process can be controlled, allowing the formation of novel nanoprisms with nanopores. This back-filling process is accompanied by a regeneration of the surface plasmon bands in the UV-visible spectrum.

21 Claims, 3 Drawing Sheets

OTHER PUBLICATIONS

International Preliminary Report on Patentability for the prosecution of International Application No. PCT/US2004/007969, dated Aug. 14, 2006.

Jin et al., "Photoinduced conversion of silver nanospheres to nanoprisms," *Science*, 294:1901-1903 (2001).

Klaus et al., "Silver-based crystalline nanoparticles, microbially fabricated," *PNAS*, 96:13611-13614 (1999).

Written Opinion of the International Searching Authority for the prosecution of International Application No. PCT/USO4/07969, dated Jun. 12, 2006.

* cited by examiner

TRIANGULAR NANOFRAMES AND METHOD OF MAKING SAME

CROSS-REFERENCE TO RELATED APPLICATION

This is a divisional of U.S. patent application Ser. No. 10/801,976, filed Mar. 15, 2004, now U.S. Pat. No. 7,252,698, which claims benefit of U.S. Provisional Patent Application Ser. No. 60/454,552, filed Mar. 14, 2003, each of which is incorporated herein in its entirety by this reference.

FIELD OF THE INVENTION

The invention resides in the field of nanoparticles, particularly triangular nanoframes that may be backfilled to form nanoprisms having nanopores.

BACKGROUND OF THE INVENTION

Metallic nanoparticles have generated significant scientific and technological interest due to their unusual optical properties, as well as their novel chemical and catalytic properties. Nonspherical particles, and in particular anisotropic particles, are of major interest because they allow investigation of how shape affects the physical and chemical properties of such structures. A variety of shapes, including stars, cubes, rods, discs, and prisms, have been fabricated, and their properties have been preliminarily characterized. Hollow nanoparticles are an interesting emerging class of materials that will help to better understand the structure-property relationship in nanoparticles.

Although a significant amount of work has been done in developing synthetic methods for hollow spheres, cubes, and rods, little has been done with triangular nanostructures. In copending patent application (Publication No. 20030136223) the current inventors disclosed a novel process in which silver nanospheres were converted, via a photomediated reaction, to larger silver nanoprisms. Xia and coworkers have demonstrated the production of hollow forms of cubes and rods, but have not disclosed a method of making frames from nanoprisms.

Thus, there remains a need for a method of generating triangular nanoframes. Preferably, the method would be operative on nanoprisms formed by known methods and applicable in a face-selective manner allowing the generation of triangular two-component nanostructures with filled or partially-filled cores.

SUMMARY OF THE INVENTION

The present invention provides a method of forming a triangular nanoframe including the step of etching a nanoprism with a salt to form a nanotriangle. The nanoprism may be silver and the salt may be a metal salt such as $HAuCl_4$. Preferably, the triangular nanoprism is contacted with the salt in a suspension of nanoprisms to which the salt is added dropwise.

The present invention also provides a method of narrowing or closing the pore in the triangular nanoframe by contacting the nanoframe with a reducing agent in the presence of the salt. Using this method, the walls of the nanoframe can be thickened to leave a narrow pore through the nanoframe. Typically, the pore has a diameter of less than about 35 nm and preferably between about 4 nm and about 14 nm. The thickness of the nanoframe is typically between about 10 nm and about 15 nm. The reducing agent is preferably a mild reducing agent such as ascorbic acid. The nanoframe may be repeatedly contacted with the salt to progressively thicken the walls of the nanoframe and reduce the diameter of the pore. If the contact with the reducing agent in the presence of a salt is repeated several times, the method of the present invention results in the reproduction of nanoprisms.

The present invention also provides triangular nanoframes having an edge length of less than about 200 nm and a thickness of less than about 100 nm and a pore through the center of the nanoframe. The triangular nanoframes have an edge length between about 70 nm and about 80 nm, a thickness between about 5 nm and about 15 nm, and a pore size between about 5 nm and about 35 m.

The present invention also provides triangular nanoframes made by the process of etching a nanoprism with a salt to form a nanotriangle. In this embodiment, the nanoprism is preferably a silver nanoprism and the salt is preferably $HAuCl_4$.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The methods of the present invention produce triangular nanoparticles with a hollow center resembling a nanotriangle. The methods of forming triangular nanoframes include etching a nanoprism with a salt to form a nanotriangle. The nanoframes may be exposed to a reducing agent in the presence of the salt causing backfilling of the hollow center of the nanoframe and thickening of the walls of the nanoframe. Repeated exposure to a reducing agent in the presence of a salt may progressively backfill the entire hollow cavity of the triangular nanoframe to form a solid triangular structure or reform a nanoprism.

The methods of the present invention form a new class of nanostructures, metallic triangular nanoframes. Additionally, the etching is face-selective and the etching and novel backfilling process results in the formation of triangular nanoframes and prisms with different compositions. Also, in a preferred embodiment, these synthetic methods result in the conversion of silver nanoprisms to gold-silver alloy nanoprisms, which are otherwise not accessible via thermal and photochemical methods for making monometallic nanoprisms.

Figure 1:
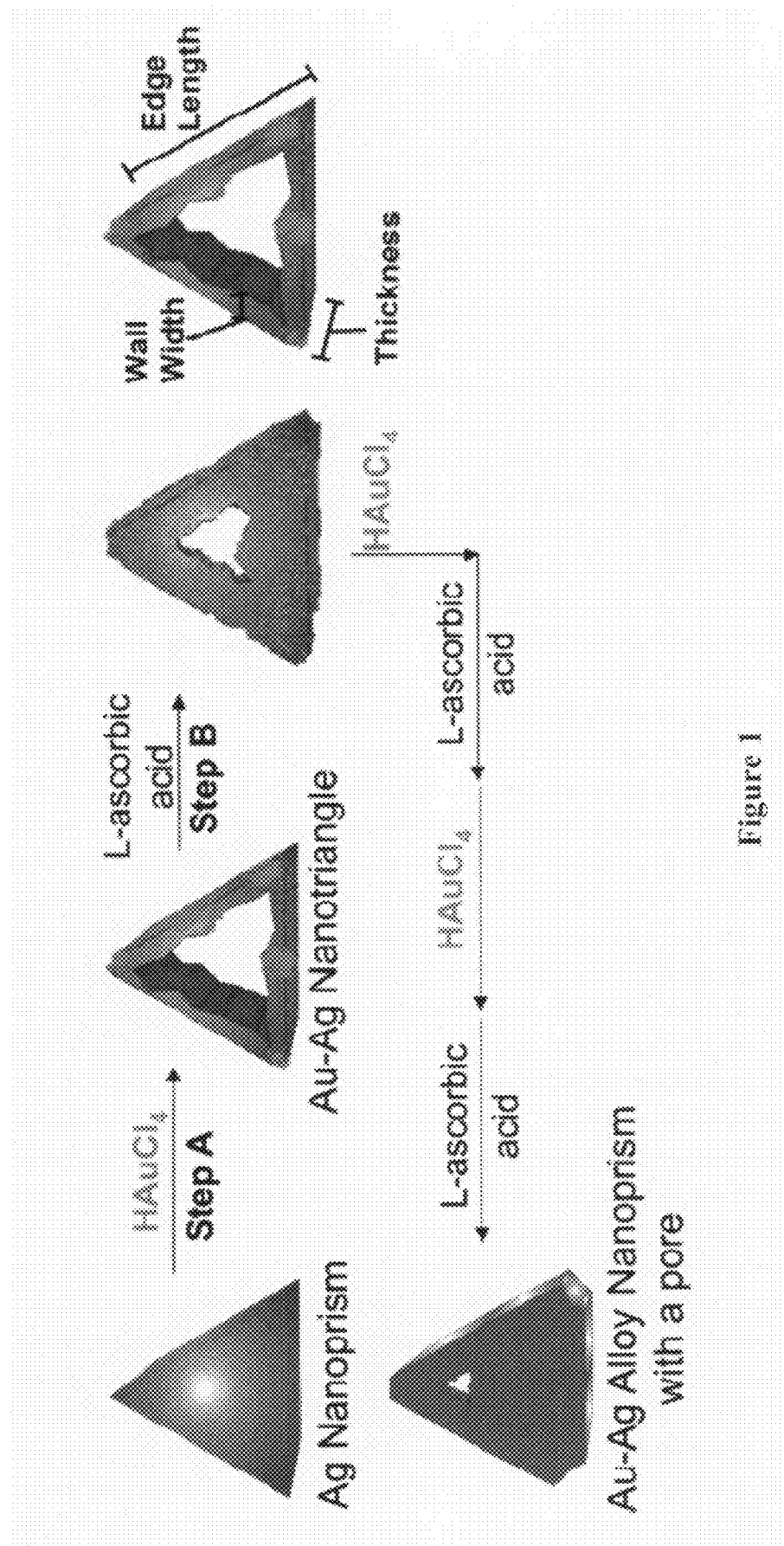
FIG. 1 shows a scheme of nanoframe synthesis. In step A, silver nanoprisms are etched with aqueous $HAuCl_4$. Subsequent addition of L-ascorbic acid (step B) causes gold and silver ions in solution to crystallize primarily on the inner walls of the nanoframes, causing the central pore to shrink in size. This gold salt/L-ascorbic acid cycle (Steps A+B) can be repeated to progressively shrink the size of the central pore.

The methods of the present invention take advantage of the large difference in reduction potential of the two reactants—the molecules forming the nanoprisms and the salt. Preferably, the nanoprisms are a metal such as silver and the salt is a metal such as gold. The disparity in the reduction potential of the Ag+/Ag pair (0.8 V, vs. SHE) and $AuCl_4^-$/Au pair (0.99V, vs SHE), results in the oxidization and etching of the silver nanoprisms by gold ions in a type of nano-Galvanic cell reaction. Surprisingly, this method does not yield hollow nanoprisms, as would be expected using the techniques of the prior art, but rather generates triangular-shaped frames with solid walls and a hole in the center (FIG. 1, Step A). Triangles are formed because this etching approach is selective for the [111] faces of the silver nanoprism over the [110] crystal plane that makes up the edges. Without intending to be bound by any one theory, this may be due to the fact that the initial nanoprism particles have thickness of only about 10 nm or that the reaction conditions are milder than those of the prior art methodology. Additionally, these structures can be back-filled to generate nanoprisms incorporating the components of the nanoframe and the salt. In the instance of a silver nanoprism and a gold salt, the nanoframes can be backfilled with gold to generate gold-silver alloy nanoprisms. Notably, these etching processes of the present invention are not observed with all metal ions. For example silver nanoprisms are not etched in a $H_2PtCl_6$ salt solution, possibly due to the relatively large lattice mismatch between platinum and silver (Pt=3.9231 Å, Ag=4.0862 Å).

The nanoprisms which represent the starting materials for the methods of the present invention have an edge length of less than about 200 nm and preferably less than about 100 nm. More preferably, these nanoprisms have an edge length of less than about 80 nm and most preferably have an edge length of between about 70 nm and about 80 nm. These nanoprisms have a thickness of less than about 100 nm and preferably less than about 25 nm. More preferably, these nanoprisms have a thickness of less than about 20 nm and most preferably have a thickness of between about 5 nm and about 15 nm. The nanoprisms may be composed of any substance that is effectively etched by the salt. Typically, the nanoprism is a metal nanoprism and preferably the nanoprism is a Group VIII, IB or IIB metal and most preferably, the nanoprism is a silver nanoprism. The nanoprisms may be made by any suitable method and methods of making metal nanoprisms suitable for use in the methods of the present invention are known in the art (Jin et al. *Science* 294:1901 (2001); co-pending U.S. patent application 20030136223).

The nanoprisms are preferably diluted in an aqueous solution to a concentration that will prevent agglomeration of the nanoframes formed in the methods of the present invention. Typically, the nanoprisms are suspended in water at a concentration between about 1 M and about 30M. Preferably, the nanoprisms are diluted to a concentration of between about 15 M and about 20 M prior to contact with the reducing agent.

Figure 2:
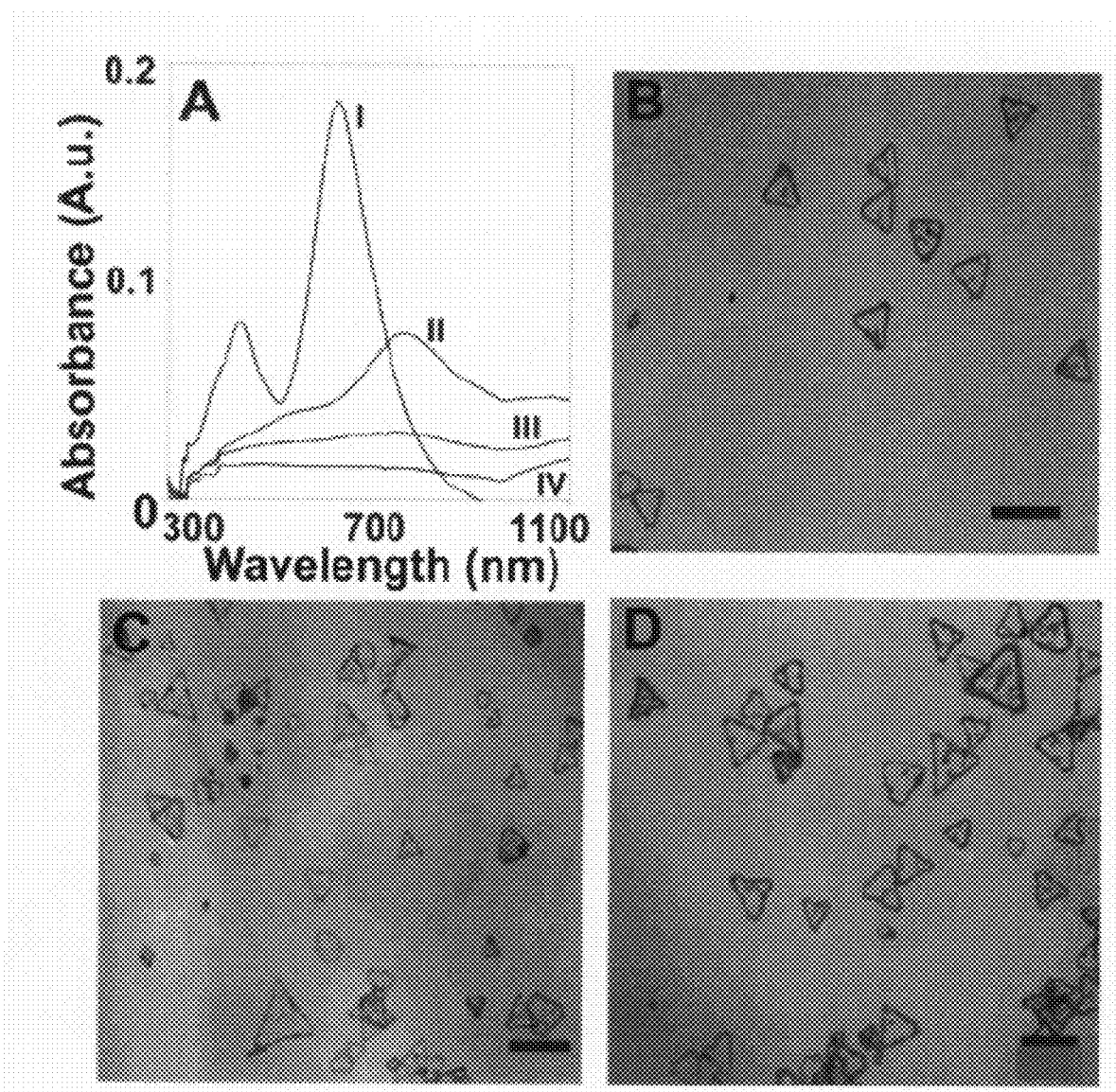
FIG. 2 shows gold-silver nanoframes; A) UV-visible spectra of triangular nanoframes with varying Au:Ag ratios and B-D) tunneling electron microscope (TEM) images of gold-silver nanoframes; B:Au:Ag ration of 1:9; C:Au:Ag ratio of 1:5; D:Au:Ag ratio of 1:3.

The nanoprisms are contacted with a salt to etch the nanoprism to form nanoframes. The salt may be any suitable salt with a greater reduction potential than the composition of the nanoframes. Typically, the salt is a metal salt, and preferably the salt is a Group VIII, IB or IIB metal salt and most preferably, the salt is a gold salt such as $HAuCl_4$. This contact is best initiated by slow or dropwise addition of the salt to the nanoprism suspension, preferably with rapid stirring of the nanoprism suspension. The amount of salt to add to the suspension of nanoprisms should be calculated by the ratio of the reductant within the salt and the chemical composing the nanoframes. For example, in the embodiment of the present invention in which silver nanoprisms are etched with $HAuCl_4$, the gold salt should be added to achieve a ratio of gold to silver (Au:Ag) between about 1:2 to about 1:10. Preferably, the Au:Ag is about 1:5. In many instances, the gold content of the suspension can be monitored by the color of the resulting suspension. For example, in the instance of silver nanoprisms etched with $HAuCl_4$, as the gold salt is added, the turquoise-blue color of the silver nanoprism colloid gradually changes to purple and finally to blue or grey. Samples with low gold content (Au:Ag=1:9) form pale blue solutions and exhibit a low intensity, broad surface plasmon band around 775 nm. In contrast, colloids containing high gold concentrations (Au:Ag=1:5 to 1:3) are pale grey (essentially colorless) and display no strong surface plasmon bands in the UV-visible spectrum (FIG. 2A).

Without intending to be bound by any one theory, it is believed that because nanoprisms possess well-defined crystal faces (instead of the highly faceted surfaces typical of "spherical" nanoparticles), the salt etches in a face-selective manner in which the prism face ([111] crystal plane) is selectively oxidized over the nanoprism edges ([110] planes). This explanation would account for the retention of the triangular shape of the initial silver nanoprisms while the gold salt etches the central silver matrix. Transmission electron microscopy (TEM) images after salt addition confirm that the resulting nanostructures are triangular in shape with hollow centers (FIG. 2B-D). The wall width of the triangular nanoframes formed refers to the width of the nanoframe vertice (when viewed from above) whereas the thickness of the triangular nanoframes refers to the height of the particle (perpendicular to its longest dimension). The pore in the triangular nanoframes refers to the passage through the center of the nanoframe and the pore size refers to the diameter of that hole. The wall width of the nanoframe increases slightly with the increasing content of the salt in the suspension. The thickness of the nanoframes is similar to that of the nanoprisms from which they are derived.

Figure 3:
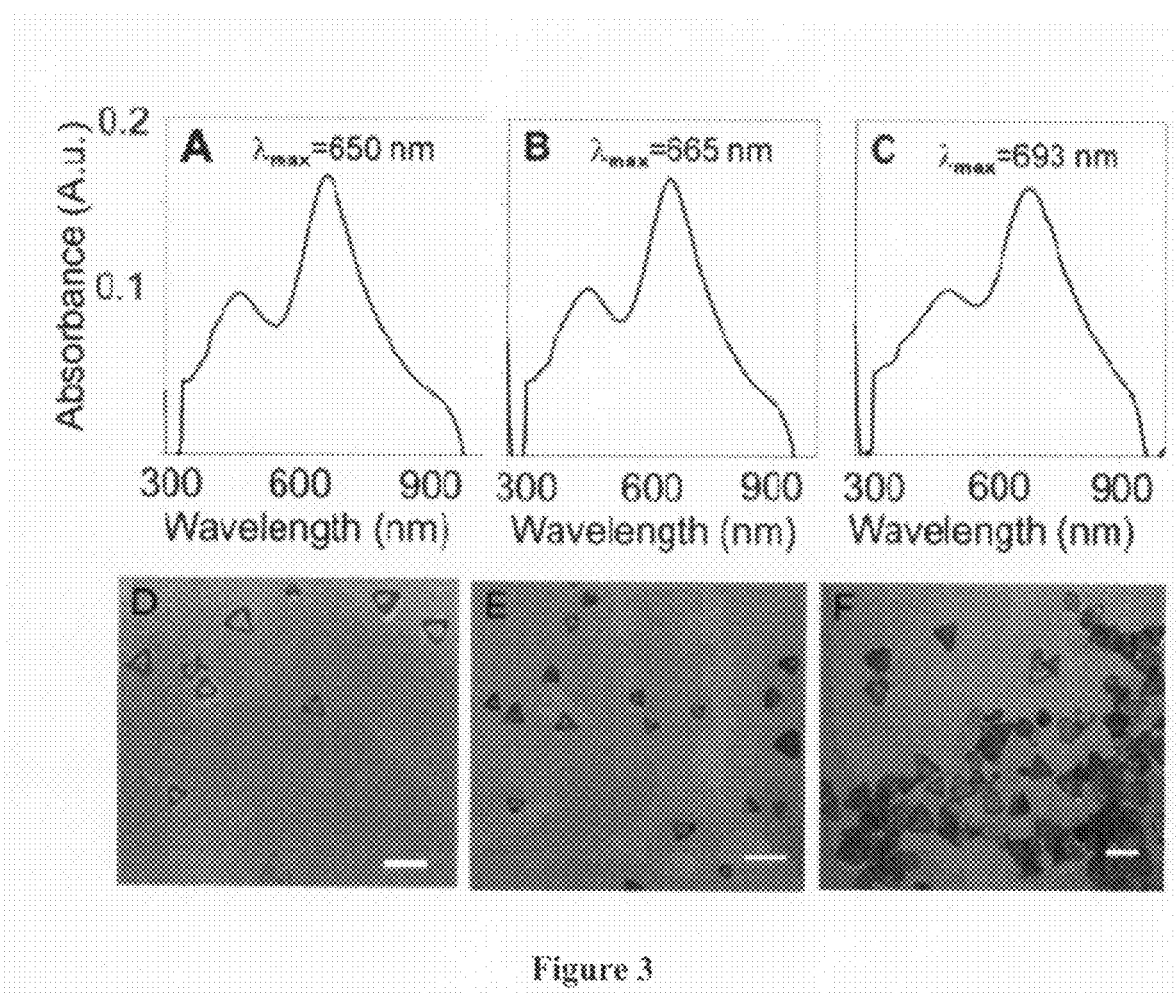
FIG. 3 shows UV-visible spectra and TEM images monitoring the back-filling process of silver and gold nanoframes having a Au:Ag ratio of 1:9. A,D) After addition of L-ascorbic acid to the triangular nanoframes. B,E) After 2 cycles of $HAuCl_4$/L-ascorbic acid. C,F) After 3 cycles of $HAuCl_4$/L-ascorbic acid.

In another embodiment of the present invention, methods of filling the hollow center of the triangular nanoframes have been devised to change the size of the central pore (FIG. 1, Step B). In this embodiment, the nanoframes are contacted with a mild reducing agent. The reducing agent causes materials removed from the nanoprisms to be reduced and agglomerate once again to the nanoframe. This causes the walls of the nanoframes to thicken and reduces the size of the central pore. As shown in FIG. 3, subsequent additions of the salt followed by the reducing agent (FIG. 1, Steps A and B), are performed to progressively reduce the size of the pore in the triangular nanoframes. Typically, the pore size is in the range between about 5 nm and about 35 nm. Referring to FIG. 3, note how the pore size becomes gradually smaller with an increasing number of cycles. Part of the material added back to the nanoframe can include the salt originally used to etch the nanoprism. Any mild reducing agent is suitable for use in the present invention. Examples of suitable reducing agents include sodium formaldehyde sulfoxylate, 2-mercaptoethanol, cysteine hydrochloride, sodium thioglycolate, hydroquinone, p-aminophenol and ascorbic acid. An exemplary reducing agent is ascorbic acid as this chemical is a mild reducing agent, nontoxic, and inexpensive. The reducing agent is added in excess, preferably dropwise to the stirring suspension of nanoframes. For example, in the instance of silver nanoframes etched with $HAuCl_4$, successive additions of ascorbic acid and $HAuCl_4$ results in a gold and silver alloy triangular nanoframe with a partially or completely filled pore. As the pore closing occurs, the metal ions (gold and silver) seem to primarily crystallize on the inner walls of the nanoframe. The faces and edges of the gold nanoprisms are rough in texture and their corners are truncated. The average edge length of the gold-silver alloy nanoprisms is between about 30 nm and about 80 nm. Typically, the average edge length of the gold-silver alloy nanoprisms is about 60 nm.

The UV-visible spectrum of the filled nanoframes can be monitored to review the progress of the pore closing. In the case of silver nanoframes, the UV-visible spectrum is red-shifted and dampened with respect to the pure silver nanoprisms (FIG. 3C). This is the same phenomenon observed in spherical Au—Ag alloy nanoparticles in which the surface plasmon band of silver nanoparticles is redshifted and dampened with increasing amounts of gold. Hence, this UV-visible data confirms that Au—Ag alloy nanoprisms are formed.

EXAMPLES

Example 1

This example demonstrates the production of silver triangular nanoframes. Silver nanoprisms having an edge length of about 74 nm ($\sigma=13\%$, N=200) and a thickness of about 9 nm ($\sigma=27\%$, N=46) were prepared as described previously (U.S. patent application Publication No. 20030136223 incorporated herein by this reference). The silver nanoprism colloid was synthesized from a 0.1 mM $AgNO_3$ solution. The Au:Ag molar ratios were calculated assuming that the silver concentration was 0.1 mM. 10 mL of silver nanoprisms were diluted with pure water to one-fifth the starting concentration (18.2M). This was done to prevent aggregation of the resulting Ag/Au triangular nanoframes. Under ambient conditions, aqueous $HAuCl_4$ (5 mM) was added dropwise to the rapidly stirring colloid. As the gold salt was added, the turquoise-blue color of the colloid gradually changed to purple and finally to blue or gray. Samples with low gold content (Au:Ag=1:9) formed pale blue solutions and exhibited a low intensity, broad surface plasmon band around 775 nm. In contrast, colloids containing high gold concentrations (Au:Ag=1:5, 1:3) were pale gray (essentially colorless) and displayed no strong surface plasmon bands in the UV-visible spectrum (FIG. 2A). Transmission electron microscopy (TEM) images after gold addition showed that the resulting nanostructures were triangular in shape with hollow centers (FIG. 1B-D).

Both wall width and thickness were measured. The wall width of the nanoframes increased slightly with gold content; 7.7 nm ($\sigma=11\%$, N=245) for Au:Ag=1:9 and 10.3 nm ($\sigma=21\%$, N=230) for Au:Ag=1:3. The thickness of the gold-silver nanoframes (10 nm, $\sigma=20\%$, N=24) was similar to that of the pure silver nanoprisms starting materials (9 nm). TEM analysis at high magnification (200,000 x) revealed that the center of each nanoframe was indeed hollow, the amorphous carbon film of the TEM support grid could be clearly seen in the underlying area. Tapping mode atomic force microscopy (AFM) analysis (using a Nanoscope III AFM, Digital Instruments) also confirmed that these nanoframes were hollow structures.

Example 2

This example demonstrates protocols that control the optical properties of the nanoframes, by changing the size of the central pore. A mild reducing agent, L-ascorbic acid, was used to reduce gold and silver ions in solution (generated from the first addition of gold salt) onto the triangular nanoframes of Example 1, causing the walls to thicken and the central pore to shrink (FIG. 1, Step B). Subsequent additions of $HAuCl_4$ followed by L-ascorbic acid (FIG. 1, Steps A and B), were performed to progressively reduce the size of the triangular nanoframe pore.

In a typical experiment, an excess of L-ascorbic acid (1 mL, 5 mM) was added dropwise to a rapidly stirring colloid of two-component nanoframes (50 mL, Au:Ag=1:9 nanoframes). After addition of the reducing agent, the pale blue colloid gradually became turquoise, as evidenced by an increase in intensity accompanied by a blue-shift in the absorption band from 775 nm to 650 nm in the UV-visible spectrum of the solution (FIG. 3A). Growth of a second band centered at 463 nm was also observed. The observed change in the UV-visible spectrum is consistent with silver ions, generated from the initial etching process with gold, being reduced back onto the nanoframe. A second aliquot of $HAuCl_4$ (22 µL, 5 mM) was added dropwise, followed by more L-ascorbic acid (1 mL, 5 mM). The surface plasmon bands associated with the partially filled triangles, at 650 nm and 463 nm, red-shifted to 665 nm and 480 nm, respectively (FIG. 3B). The third and final addition of $HAuCl_4$ (22 µL, 5 mM) and L-ascorbic acid (1 mL, 5 mM) caused the most intense band at 665 nm to further red-shift to 693 nm (FIG. 2C). The shorter wavelength band also red-shifted to 508 nm but became a shoulder on the main surface plasmon band. The red-shift observed after the second and third $HAuCl_4$/L-ascorbic acid additions was consistent with gold ions being reduced onto the nanoframe. Reduction of gold ions onto the nanoframe walls is responsible for the "backfilling" of the nanoframes to form alloy nanoprisms. The change in pore size of the triangular nanoframes as a function of Au deposition was monitored by TEM (FIG. 3 D-F). After the first reduction, the pore size decreased from about 33 nm ($\sigma=23\%$, N=286) to about 14 nm ($\sigma=16\%$, N=695). The second addition of gold salt followed by reduction, generated triangular nanoframes with average pore sizes of about 7 nm ($\sigma=14\%$, N=744). After the third gold/reduction cycle, many of the nanoframes were completely filled, and the remaining particles possessed average pore sizes of about 4 nm ($\sigma=13\%$, N=659). After one cycle of $HAuCl_4$/L-ascorbic acid, the thickness of the nanoframes increased from approximately 10 nm ($\sigma=13\%$) to 12.4 nm ($\sigma=11\%$, N=89). After three $HAuCl_4$/L-ascorbic acid cycles, the thickness had increased to about 15.2 nm ($\sigma=10\%$, N=8). The UV-vis spectrum of the filled nanoframes was red-shifted and dampened with respect to the pure silver nanoprisms (FIG. 3C). TEM-Energy Dispersive X-ray (EDX) analysis confirmed that the back-filled nanoprisms were gold-silver alloys. The average edge length of the gold-silver alloy nanoprisms is approximately 63 nm.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of forming a triangular nanoframe comprising etching a nanoprism with a salt to form a nanotriangle.

2. The method of claim 1, wherein the nanoprism is a silver nanoprism.

3. The method of claim 1, wherein the sale salt is a metal salt.

4. The method of claim 1, wherein the nanoprism is a silver nanoprism, the salt is a metal salt and the ratio of the metal salt to the silver is between about 1:2 to about 1:10.

5. The method of claim 4, wherein the metal salt is $HAuCl_4$ and has a concentration of about 5 mM.

6. The method of claim 1, wherein the thickness of the nanoprism is less than about 100 nm.

7. The method of claim 1, wherein the nanoprism is in a suspension of nanoprisms in water.

8. The method of claim 7, wherein the suspension of nanoprisms has a concentration of between about 1M and about 30M.

9. The method of claim 7, wherein the step of etching comprises the dropwise addition of a metal salt solution to the suspension of nanoprisms.

10. The method of claim 9, wherein the salt solution is $HAuCl_4$.

11. The method of claim 1, comprising the additional step of contacting the nanoframe with a reducing agent in the presence of the salt.

12. The method of claim 11, wherein the walls of the nanoframe are thickened by the contacting step.

13. The method of claim 12, wherein the walls are thickened to form a pore in the nanoframe having diameter up to about 35 nm.

14. The method of claim 13, wherein the pore in the nanoframe has diameter between about 4 nm and about 14 nm.

15. The method of claim 13, wherein the pore in the nanoframe has diameter between about 4 nm and about 7 nm.

16. The method of claim 12, wherein the thickness of the nanoframe following the contacting step is between about 10 nm and about 15 nm.

17. The method of claim 16, wherein the thickness of the nanoframe following the contacting step is about 12 nm.

18. The method of claim 11, wherein the reducing agent is ascorbic acid.

19. The method of claim 11, wherein the contacting step is repeated at least twice.

20. The method of claim 11, wherein the contacting step is repeated three times.

21. The method of claim 1, wherein the triangular nanoframes formed have truncated corners.

\* \* \* \* \*

UNITED STATES PATENT AND TRADEMARK OFFICE
CERTIFICATE OF CORRECTION

PATENT NO. : 7,611,562 B2
APPLICATION NO. : 11/786172
DATED : November 3, 2009
INVENTOR(S) : Chad A. Mirkin et al.

It is certified that error appears in the above-identified patent and that said Letters Patent is hereby corrected as shown below:

Col. 1, Line 1 insert:

--Statement of U.S. Government Support

This invention was made with government support under F49620-02-1-0180 awarded by Air Force Office of Scientific Research and EEC-0118025 awarded by National Science Foundation. The government has certain rights in the invention.--

Signed and Sealed this
Tenth Day of January, 2012

David J. Kappos
*Director of the United States Patent and Trademark Office*